United States Patent
Ekman et al.

(10) Patent No.: US 11,254,585 B2
(45) Date of Patent: Feb. 22, 2022

(54) METHOD FOR TREATING PICKLING ACID RESIDUE

(71) Applicant: CrisolteQ Ltd, Harjavalta (FI)

(72) Inventors: Kenneth Ekman, Harjavalta (FI); Peik Ekman, Harjavalta (FI); Elina Lappalainen, Harjavalta (FI)

(73) Assignee: CrisolteQ Ltd, Harjavalta (FI)

( * ) Notice: Subject to any disclaimer, the term of this patent is extended or adjusted under 35 U.S.C. 154(b) by 0 days.

(21) Appl. No.: 17/126,254

(22) Filed: Dec. 18, 2020

(65) Prior Publication Data

US 2021/0188659 A1 Jun. 24, 2021

(30) Foreign Application Priority Data

Dec. 19, 2019 (FI) ...................... 20196110

(51) Int. Cl.
| | | |
|---|---|---|
| *C01G 53/00* | (2006.01) | |
| *C01G 53/10* | (2006.01) | |
| *C01F 5/40* | (2006.01) | |
| *C22B 7/00* | (2006.01) | |
| *C22B 3/00* | (2006.01) | |

(52) U.S. Cl.
CPC .............. *C01G 53/10* (2013.01); *C01F 5/40* (2013.01); *C01G 53/003* (2013.01); *C22B 7/006* (2013.01); *C22B 23/04* (2013.01)

(58) Field of Classification Search
CPC ...... C01G 53/003; C01G 53/10; C22B 7/006; C22B 23/04; C01F 5/40
USPC ........................................................ 423/139
See application file for complete search history.

(56) References Cited

U.S. PATENT DOCUMENTS

| | | | |
|---|---|---|---|
| 10,526,684 B2 * | 1/2020 | Ekman | .................... C22B 23/04 |
| 2002/0031463 A1 | 3/2002 | White | |
| 2011/0308352 A1 | 12/2011 | Mäkelä et al. | |
| 2019/0119780 A1 | 4/2019 | Ekman et al. | |

FOREIGN PATENT DOCUMENTS

| | | |
|---|---|---|
| CA | 1077176 A | 5/1980 |
| EP | 0161050 A1 | 11/1985 |
| EP | 0997436 A1 | 5/2000 |
| EP | 3473738 A1 | 4/2019 |

(Continued)

OTHER PUBLICATIONS

Liu et al: Recovery of valuable metals from a low-grade nickel ore using an ammonium sulfate roasting-leaching process. International Journal of Minerals, Metallurgy and Materials, May 1, 2012, vol. 19, No. 5, pp. 377-383.

(Continued)

*Primary Examiner* — Steven J Bos
(74) *Attorney, Agent, or Firm* — Laine IP Oy

(57) ABSTRACT

A novel process for treating pickling acid residue and recovering sulfates and nickel therefrom has been developed. By lowering the pH of a magnesium compound slurry to 4-5.5 with sulfuric acid containing pickling acid residue in the presence of ammonium sulfate, both magnesium sulfate and nickel sulfate are solubilized. Magnesium sulfate and nickel sulfate solution is separated from the solids by filtration and an iron hydroxide and chromium hydroxide residue is obtained as a precipitate. Magnesium sulfate and nickel sulfate are then separated from the solution.

8 Claims, 2 Drawing Sheets

(56) References Cited

FOREIGN PATENT DOCUMENTS

| | | |
|---|---|---|
| GB | 2036573 A | 7/1980 |
| WO | WO9504844 A1 | 2/1995 |
| WO | WO9704139 A1 | 2/1997 |
| WO | WO2010051992 A1 | 5/2010 |

OTHER PUBLICATIONS

Murthy et al: Distribution of Isomorphous Salts between Aqueous and Solid Phases in Fractional Crystallization. Nickel Ammonium Sulfate-Magnesium Ammonium Sulfate-Water and Barium Nitrate-Lead Nitrate-Water Systems. Industrial and Engineering Chemistry Process Design and Development, Apr. 1, 1970, vol. 9, No. 2, pp. 260-263.

Nyman et al: Application of new hydrometallurgical developments in the Outokumpu HIKO Process. Hydrometallurgy, Jun. 1, 1992, vol. 29, No. 1/03, pp. 461-478.

Pushkar et al: Recovery of nickel from pickling sludge. Journal of Environmental Research and Development, Jan. 1, 2015, Short Communication (NS-II), pp. 617-620.

\* cited by examiner

METHOD FOR TREATING PICKLING ACID RESIDUE

FIELD OF THE INVENTION

This invention relates to a novel method for recovering sulfates and nickel from pickling acid residue (PAR). The components are recovered as magnesium sulfate and nickel sulfate.

BACKGROUND OF THE INVENTION

Pickling is a process in stainless steel production that refers to treating the steel with a mixture of acids to remove metal oxides and chrome-depleted layers from the steel. For instance, stainless steel is usually pickled with a mixture of nitric/hydrochloric/hydrofluoric acid or a combination of sulfuric acid/hydrofluoric acid. This results in an acidic solution containing various metals (such as nickel, chromium and iron) and when the amounts of dissolved metals are too high, the pickling acids loses their effectiveness.

The primary acid used for pickling is hydrochloric acid, but a combination of various acids such as hydrofluoric, nitric, hydrochloric and sulfuric acid has also been a common choice. In automatic steel mills, hydrochloric acid is used as it pickles much faster while minimizing metal loss. Carbon steels with less than 6% alloy content are generally pickled in hydrochloric or sulfuric acids, while higher alloy content steels require a two-step pickling process using acids such as nitric, phosphoric or hydrofluoric acid. For rust and acid resistant steels, a pickling bath of nitric and hydrochloric acid is used.

Several different technologies have been developed to recycle the pickling acids and to recover the dissolved metals for re-use. Patent GB 2 036 573 discloses the process of distillation of volatile acids in the presence of sulfuric acid and the recovery of the volatile acids by means of condensation. In a similar way, publication WO95/04844 discloses a process where volatile acids containing metal salt impurities, such as metal pickling solutions, are regenerated by a process in which the acid is subjected to sulfuric acid distillation. The resulting volatile acid vapor is condensed and recycled to the pickle tank, while the residual acid mixture is treated in an acid absorption unit, preferably of the acid retardation type. Acid absorbed in the acid absorption unit is periodically eluted with water and recycled, while metal impurities, in the form of sulfates are rejected, typically neutralized and discarded.

Publication WO2010/051992 discloses a process for complete recovery of metals and acids from solutions and sludge coming from stainless steel works. Volatile acids are recovered through distillation in the presence of sulfuric acid, while the metals are separately recovered in the form of hydroxides or salts. The metals are recovered by neutralization and precipitation with sodium hydroxide.

Current recovery efforts include ionic exchange methods, where metal ions are absorbed by an anionic bed, thus allowing the acids to be recycled back into the process. The metals can then be released with sedimentation and microfiltration of the bed, then regenerating the bed with water. Using this method, the need for new acids is reduced by 30 to 50% depending on the acid.

At Outokumpu steel mill in Tornio, Finland, a method for recycling of nitric and hydrofluoric acid uses evaporation, where sulfuric acid is first mixed into the pickling liquor, which in turn is then evaporated under vacuum at 80° C. The nitric and hydrofluoric acids evaporate and can be recycled, and the remaining material is a cake of metal sulfates and free sulfuric acid.

A common problem with metal recovery from pickling acid residues is filtration, as hydroxides tend to bind water and thus create a gel, making filtration difficult or impossible. Ferrous hydroxides are generally the most abundant hydroxides in pickling acid residues, and in European patent application publication No. EP 0 161 050, a method using solvent extraction to selectively remove $Fe^{3+}$ is described. This method, while effective in removing iron from the pickling waste, still leaves other metal ions in the solution, which is now very difficult to treat due to residual liquid from the solvent extraction.

Typically, the solution is treated with lime to neutralize the acids and the material is then landfilled. Alkali neutralization is commonly done with limestone, either as calcium carbonate, calcium oxide or calcium hydroxide. Alternatively, sodium hydroxide and potassium hydroxide can be used and are faster acting, requiring only about 5-10 minutes to fully neutralize any pickling waste in contrast to about 30 minutes when neutralized with limestone. While NaOH and KOH are more expensive chemicals, less is required, so both time and material is saved. However, limestone neutralization gives better sedimentation and dewatering properties of the formed hydroxides, reducing the chance of metal seepage into the environment. The divalent charge of calcium is the primary reason for this, as the ionic strength of the bond becomes more powerful.

In CA 1 077 176 from 1977 it is described a process for the neutralization of waste industrial sulfuric acids. The process comprises partial neutralization of waste industrial sulfuric acids with solid magnesium compound to form a slurry containing magnesium sulfate. The thus formed slurry is then subjected to a further neutralization step under oxidizing conditions. An addition of magnesium hydroxide may be followed to obtain neutralized slurry. The filtrate containing the magnesium sulfate is recovered. In this method it is mandatory to do part of the neutralization under oxidizing conditions to avoid generation of viscous silicic acid, which causes problems in filtration stage.

To recover both the acids and the metals would be an important step towards a more economical and environmentally friendly process. The residue contains valuable metals in consistent concentrations and could potentially be processed into metal products or used as raw material for other processes. Potentially the residue could be processed into raw material for the steel industry according to US patent publication 2011/0308352A1, where residues containing iron, nickel and chromium (FeNiCr cake) and the cake containing iron and chromium (FeCr) could be processed into nickel-containing ferrochrome, which can then be used in the steel industry. In the method according to the US application nickel-containing material is mixed with iron-containing chromite concentrate and a binder, creating ferrochrome nickel.

In EP 3 473 738 A1 it is disclosed a process for treating and recovering valuable metals and other components from pickling acid residue (PAR). The metals and other components are recovered by mixing the pickling acid residue with a magnesium compound or a mixture of magnesium compounds, and separating components of the resulting mixture (metals and sulfates) into products that can be reused, such as magnesium sulfate, nickel sulfate, iron and chromium phosphate, or various metal hydroxides or oxides.

SUMMARY OF THE INVENTION

A novel process for treating pickling acid residue (PAR) and recovering sulfates and nickel therefrom has been discovered. It was surprisingly found that by lowering the pH of a magnesium compound(s) slurry (Mg-slurry) to pH 4-5.5 with pickling acid residue containing sulfuric acid to obtain magnesium and pickling acid residue slurry (Mg/PAR-slurry) in the presence of ammonium sulfate, both magnesium sulfate and nickel sulfate are solubilized. Magnesium sulfate and nickel sulfate are separated from the solids by filtration, obtaining a nickel sulfate and magnesium sulfate solution as a filtrate (Ni/Mg sulfate solution filtrate) and an iron hydroxide and chromium hydroxide precipitate i.e. FeCr residue. Magnesium sulfate and nickel sulfate are then separated from the solution.

According to the present invention first at least one magnesium compound selected from the group consisting of magnesium oxide, magnesium hydroxide and magnesium carbonate or any combination thereof is slurried under continuous stirring with water to obtain a magnesium compound(s) slurry (Mg-slurry). The Mg-slurry is adjusted to contain between 10-70 g/l magnesium, preferably 30-60 g/l. Then, pickling acid residue, which contains nickel, chromium and iron as sulfates as well as free sulfuric acid, is gradually added to the Mg-slurry to lower the pH of the slurry to pH 4-5.5 and to obtain magnesium compound(s) and pickling acid residue containing slurry (Mg/PAR-slurry). The slurry is continuously stirred during the addition of PAR. The temperature of the mixture is kept between 70° C. and 90° C. during the gradual addition of PAR. Pickling acid residue can be added as solid or as a water suspension. Ammonium sulfate is added to the Mg/PAR-slurry to improve filtration. Ammonium sulfate can be added at any stage before filtration.

After completing the addition of PAR, stirring of the Mg/PAR-slurry is continued for at least 30 minutes and the temperature is kept between 70° C. and 90° C. Both magnesium sulfate and nickel sulfate are solubilized during this step and are then separated from the solids by filtration, obtaining a nickel sulfate and magnesium sulfate solution as a filtrate i.e. Ni/Mg sulfate solution filtrate. The precipitate is iron hydroxide and chromium hydroxide i.e. FeCr residue.

After filtration the sulfates and nickel are recovered by separating them from the solution. Magnesium sulfate and nickel sulfate can be separated from the solution by chelating ion exchange or other applicable hydrometallurgical routes e.g. precipitation.

DETAILED DESCRIPTION OF THE INVENTION

Figure 1:
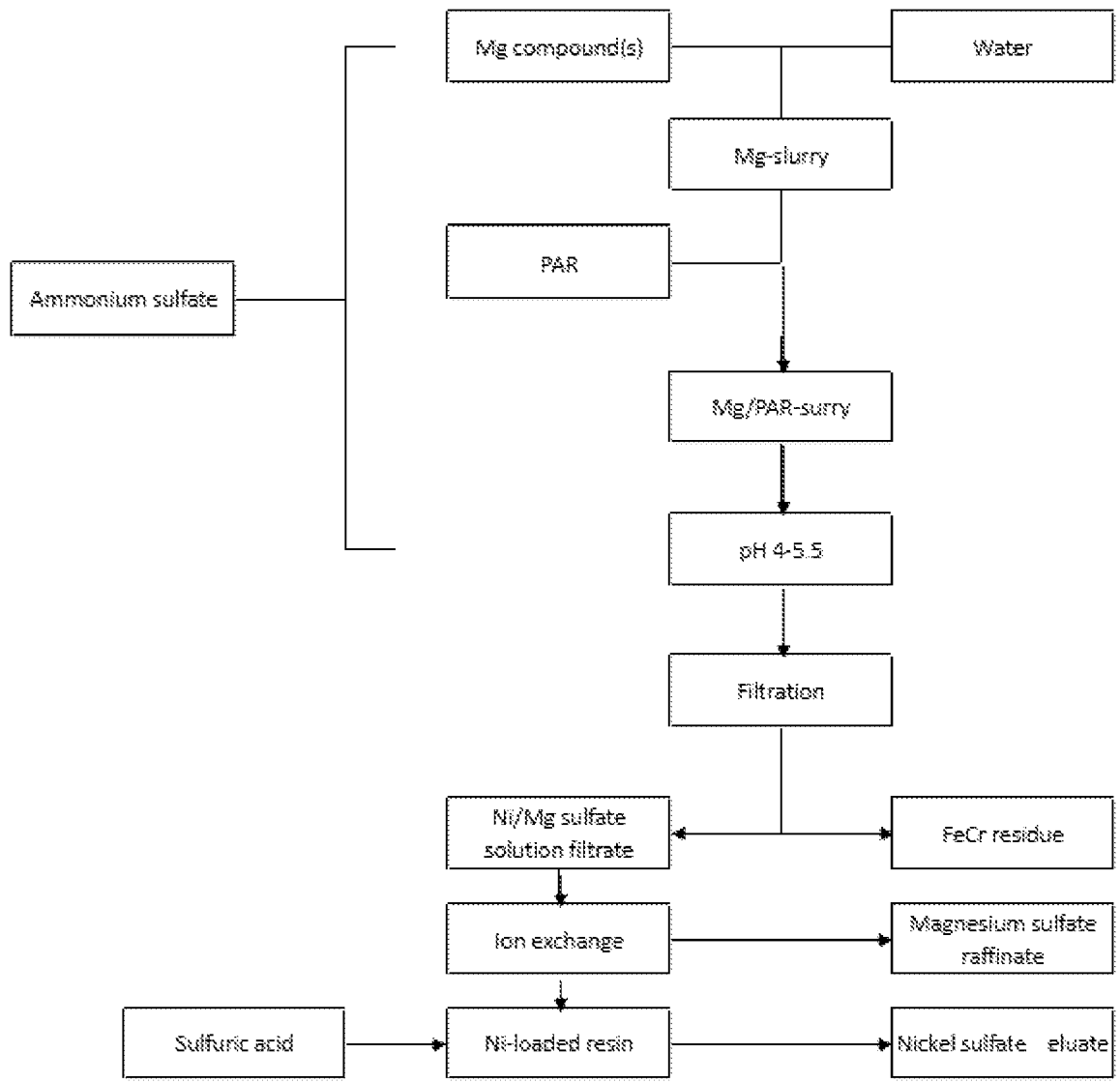
FIG. 1. A schematic process scheme; one embodiment of the process according to the invention FIG. 2. Elution of Ni-loaded resin with 20 wt-% sulfuric acid. Sample size 10 ml (Example 3)

Typically, pickling acid residue i.e. PAR contains metals such as nickel, chromium and iron in the form of sulfates and free sulfuric acid. Sulfate content can be up to 60% of the total weight, out of which half is free sulfuric acid. The nickel content is typically in the range of 1-5 wt-%, while iron content is typically in the range of 10-15 wt-% and chromium content in the range of 1-5 wt-%.

According to the present invention separation of nickel and sulfates from the other components in pickling acid residue is accomplished by adjusting pH of a magnesium compound(s) slurry i.e. Mg-slurry to pH 4-5.5 in the presence of ammonium sulfate using sulfuric acid containing pickling acid residue. At this pH range iron and chromium are insoluble hydroxides and can be separated by filtration from the soluble sulfate salts; nickel as nickel sulfate and remaining sulfates as magnesium sulfate.

In the method according to the invention, first at least one magnesium compound selected from the group consisting of magnesium oxide, magnesium hydroxide and magnesium carbonate or any combination thereof, is slurried in water under continuous stirring to obtain a Mg-slurry. The final Mg-slurry is adjusted to contain between 10-70 g/l magnesium, preferably 30-60 g/l.

The at least one magnesium compound selected from the group consisting of magnesium oxide, magnesium hydroxide and magnesium carbonate is preferably magnesium oxide. The magnesium compound can be magnesium hydroxide. It is also possible to use magnesium carbonate as the magnesium compound. Magnesium oxide, magnesium hydroxide and magnesium carbonate can also be used as a combination.

The at least one magnesium compound or the combination of magnesium oxide, magnesium hydroxide and magnesium carbonate can be used in dry form or as a water slurry.

Depending on the magnesium compound or the mixture of magnesium compounds used, the dissolution time varies. For example, with magnesium carbonate the dissolution time is longer than with magnesium hydroxide.

Then sulfuric acid containing pickling acid residue, which contains nickel, chromium and iron as sulfates as well as free sulfuric acid is added under continuous stirring to the Mg-slurry to lower the pH to 4-5.5 and to obtain a Mg/PAR-slurry, adjusting until pH is stable. Pickling acid residue can be added as solid or as a water slurry.

Ammonium sulfate is added to the Mg/PAR-slurry to improve filtration to a concentration between 0.5 and 5% (w/V), preferably 2-3% (w/V). Ammonium sulfate can be added at any stage before filtration.

Temperature is kept between 70° C. and 90° C. during the addition of PAR. After the addition of PAR is completed i.e. stable pH between 4 and 5.5 is obtained, mixing i.e. continuous stirring of Mg/PAR-slurry is continued for a minimum of 30 minutes and up to 6 hours, preferably 3-5 hours at a temperature between 70° C. and 90° C.

Nickel sulfate and magnesium sulfate are both solubilized during the mixing step. After stirring the slurry is filtered and a nickel sulfate and magnesium sulfate solution is obtained as a filtrate (Ni/Mg sulfate solution filtrate). FeCr residue, containing iron hydroxide and chromium hydroxide, is obtained as a precipitate.

In the final step of the process according to the present invention, sulfates and nickel are recovered i.e. separated from the solution.

Sulfates can be recovered as magnesium sulfate by adsorbing nickel from the solution with an ion exchange resin, creating a magnesium sulfate raffinate. Ion exchange resin functional groups can be imino di-acetate (IDA) or bis-picolyl amine (BPA). Nickel is eluted from the resin as a nickel sulfate eluate using sulfuric acid as eluent.

Magnesium sulfate and nickel sulfate can be separated from the Ni/Mg sulfate solution filtrate also by other applicable hydrometallurgical routes e.g. precipitation.

Next, the invention is described with reference to the following examples, which are not intended to limit the scope of the invention.

EXAMPLES

The composition of the pickling acid residue (PAR) used in the disclosed Examples 1 and 2 is shown in Table 1. Metal content was determined by MP-AES (microwave plasma atomic emission spectrometer, Agilent Technologies), and sulfate content was determined by titration with NaOH/EDTA as titrant. Balance is moisture.

TABLE 1

Composition of PAR in disclosed examples.

| Element | mg/kg |
|---|---|
| Al | <300 |
| Ca | <600 |
| Co | <600 |
| Cr | 16 300 |
| Cu | 712 |
| Fe | 106 000 |
| K | <600 |
| Mg | <200 |
| Mn | 1040 |
| Na | <1000 |
| Ni | 11 700 |
| Zn | <500 |
| $SO_4^{2-}$ | 620 000 |

Example 1

110 g of magnesium oxide (MgO) (93 w/w % MgO content) was slurried in 900 ml $H_2O$ together with 30 g ammonium sulfate. PAR was added gradually during 2 hours under continuous stirring until pH was stable at 4. Total required amount of PAR was 355 g. The temperature during the addition of PAR was kept at 80° C. The mixing i.e. continuous stirring at 80° C. was continued for an additional 30 minutes and the mixture was then filtered using a Buchner funnel. The filtrate, containing nickel- and magnesium sulfate, was analyzed for metal content with MP-AES. The results are presented in table 2.

TABLE 2

Composition of the filtrate.

| Element | mg/l | Yield |
|---|---|---|
| Mg | 52 700 | 81% |
| Ni | 2400 | 50% |
| $SO_4^{2-}$ | 212248 | 96% |

Sulfate yield was high, having solubilized nickel and magnesium to 50% and and 81% respectively. It is possible that while there are enough sulfates available, the short reaction time means it is still in the form of free sulfuric acid.

Nickel and magnesium were separated using chelating ion exchange resin containing iminodiacetic acid functional groups. 20 ml of Lanxess TP208 MDS resin was loaded into a 150 ml drip column and washed with 50 ml $H_2O$ before use. The resin was in sodium form.

200 ml of nickel- and magnesium sulfate solution filtrate from step 1 was passed through the resin bed and 10 samples of 20 ml were collected. Solution was passed through at a rate of 4 BV/h (BV:Bed Volume, 20 ml). Resin was washed with 50 ml water, and then eluted with 20 ml of a 20 w/V % sulfuric acid solution. All samples were analyzed with MP-AES (tables 3 and 4).

Analysis of raffinate solution from column shows selective binding of nickel (table 3).

TABLE 3

Metal content of the raffinate solution at 4 BVs (80 ml).

| Element | mg/l |
|---|---|
| Mg | 46 400 |
| Ni | <50 |

The metal content of the eluate solution is presented in table 4.

TABLE 4

Metal content of the eluate solution.

| Element | mg/l |
|---|---|
| Mg | 4290 |
| Ni | 9010 |

Example 2

Procedure in Example 1 was repeated but mixing time after addition of PAR was increased from 30 minutes to 3 hours. The filtrate was analyzed for metal content with MP-AES and the results are presented in Table 5. Sulfate content was calculated according to metal content.

TABLE 5

Metal content and calculated metal yields of the nickel- and magnesium sulfate solution.

| Element | mg/l | Yield |
|---|---|---|
| Mg | 58 500 | 94% |
| Ni | 3150 | 70% |
| $SO_4^{2-}$ | 236402 | 100% |

Using a longer reaction time, the nickel yield was 70% and magnesium yield was 94% (table 5). Sulfate yield was also increased to 100%.

Example 3

Nickel and magnesium sulfate solution from Example 2 was passed through 50 ml chelating resin (Tulsion CH-90, IDA functional group) with a pump in upflow mode. Total 300 ml of solution was passed through the column and 3×100 ml samples were collected and analysed.

Analysis of the 100 ml sample solutions show initial binding of magnesium and then slowly releasing it when replaced by nickel (table 6).

TABLE 6

Metal content of the raffinate (ppm) at given volumes

| Element | 100 ml | 200 ml | 300 ml |
|---|---|---|---|
| Mg | 41 700 | 59 200 | 65 300 |
| Na | 21 400 | <1000 | <1000 |
| Ni | <50 | 254 | 431 |

Sodium is released from the resin in initial stages as magnesium enters the system, and then on continuation of the trial nickel slowly replaces magnesium.

Figure 2:
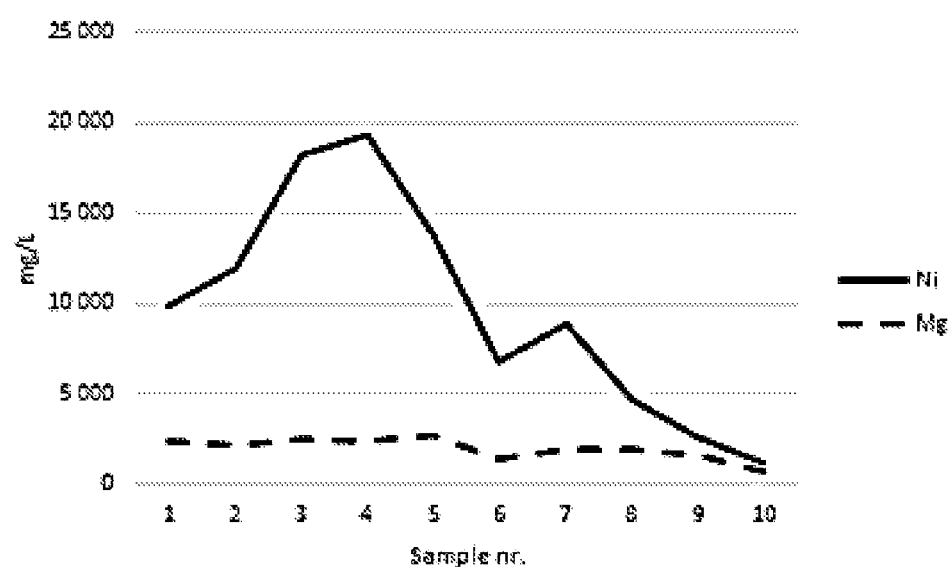

Elution of the resin shows release of nickel and a small amount of magnesium, indicating nickel had not yet fully replaced magnesium in the resin (FIG. 2).

The invention claimed is:

1. A method for recovering sulfates and nickel from a sulfuric acid containing pickling acid residue comprising the steps of:
   slurrying under continuous stirring at least one magnesium compound selected from the group consisting of magnesium oxide, magnesium hydroxide, magnesium carbonate, and combinations thereof into water;
   adding sulfuric acid containing pickling acid residue (PAR) under continuous stirring to obtain a Mg/PAR-slurry with a stable pH of 4-5.5 at a temperature between 70° C. and 90° C.;
   continuing continuous stirring of the obtained Mg/PAR-slurry for at least 30 minutes at the temperature between 70° C. and 90° C.;
   adding ammonium sulfate at any stage before filtration of the obtained Mg/PAR-slurry;
   separating an iron and chromium-containing residue by filtration and obtaining a solution of nickel sulfate and magnesium sulfate as a filtrate; and
   recovering sulfates and nickel from the nickel sulfate and magnesium sulfate solution filtrate.

2. The method for recovering according to claim 1, wherein the sulfates are recovered as magnesium sulfate solution by separating the nickel from the nickel sulfate and magnesium sulfate solution filtrate by adsorbing nickel on an ion exchange resin and nickel is recovered as nickel sulfate from the ion exchange resin by elution with sulfuric acid.

3. The method for recovering according to claim 1, wherein the magnesium compound is magnesium oxide.

4. The method for recovering according to claim 1, wherein the magnesium compound is magnesium hydroxide.

5. The method for recovering according to claim 1, wherein the magnesium compound is magnesium carbonate.

6. The method for recovering according to claim 1, wherein the magnesium compound is a combination of magnesium oxide, magnesium hydroxide, and magnesium carbonate.

7. The method for recovering according to claim 1, wherein the at least one magnesium compound is added in dry form.

8. The method for recovering according to claim 1, wherein the concentration of the ammonium sulfate in the Mg/PAR-slurry is between 0.5 and 5% (w/V).

* * * * *